Figure 5:
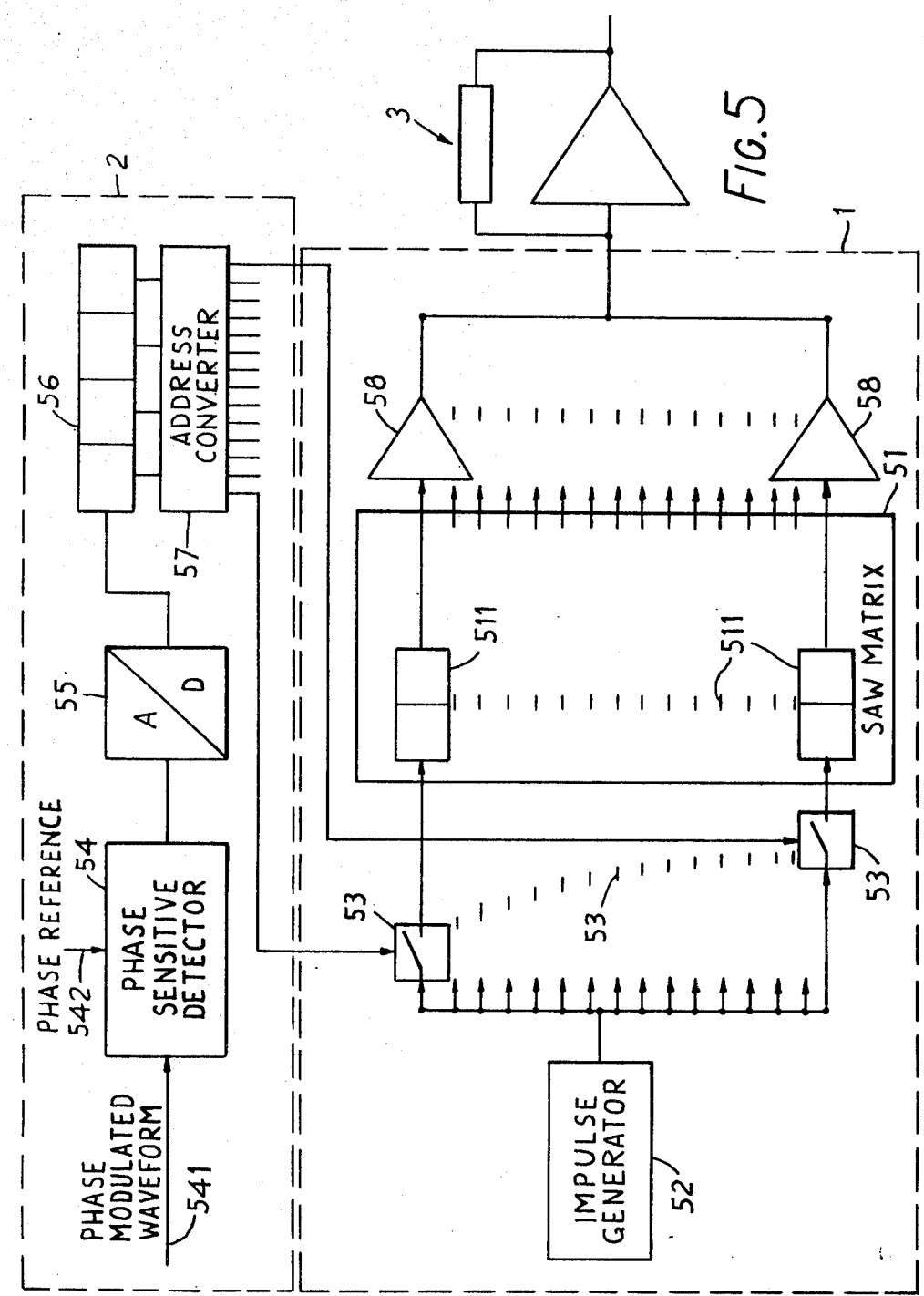

United States Patent [19]

Voles

[11] 4,179,672

[45] Dec. 18, 1979

[54] PHASE MODULATION SYSTEM FOR COMBINING CARRIER WAVE SEGMENTS CONTAINING SELECTED PHASE TRANSITIONS

[75] Inventor: Roger Voles, London, England

[73] Assignee: E M I Limited, Hayes, England

[21] Appl. No.: 919,907

[22] Filed: Jun. 28, 1978

Related U.S. Application Data

[63] Continuation-in-part of Ser. No. 809,365, Jun. 23, 1977, abandoned.

[30] Foreign Application Priority Data

Jun. 26, 1976 [GB] United Kingdom ............... 26729/76

[51] Int. Cl.$^2$ ............................................. H04L 27/20
[52] U.S. Cl. ............................... 332/16 R; 178/66 A; 325/161; 332/26; 333/150; 333/187
[58] Field of Search ................... 332/16 R, 16 T, 9 R, 332/9 T, 26; 325/30, 161, 163; 178/66 A, 66 R; 333/30 R, 72

[56] References Cited

U.S. PATENT DOCUMENTS

| | | | |
|---|---|---|---|
| 3,969,590 | 7/1976 | Jain et al. | 325/163 X |
| 3,988,540 | 10/1976 | Scott et al. | 325/163 X |

FOREIGN PATENT DOCUMENTS

1464865  2/1977  United Kingdom ................... 332/9 R

OTHER PUBLICATIONS

Hartman et al., "Impulse Model Design of Acoustic Surface-Wave Filters", IEEE Transactions on Microwave Theory and Techniques, vol. MTT-21, Apr. 1973, pp. 162–175.

Bell, Jr. et al., "Application of Acoustic Surface-Wave Technology to Spread Spectrum Communications", IEEE Transactions on Microwave Theory and Techniques, vol. MTT-21, Apr. 1973, pp. 263–271.

*Primary Examiner*—Siegfried H. Grimm
*Attorney, Agent, or Firm*—Fleit & Jacobson

[57] ABSTRACT

A phase modulation system is described in which the phase of a carrier wave can assume one of a number of permitted values in each symbol period and wherein transitions between the permitted values occur at transition periods between symbol periods. Difficulties associated with phase transitions are reduced or overcome by storing or generating the transitions with a number of cycles of the carrier wave of the appropriate phase(s) on either side thereof, a wave train being built up by merging the corresponding oscillations of the same phase which succeed and preceed respectively two adjacent transitions.

6 Claims, 6 Drawing Figures

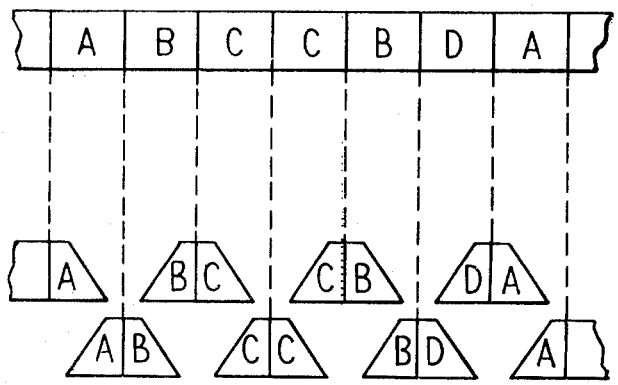
FIG. 1
FIG. 3
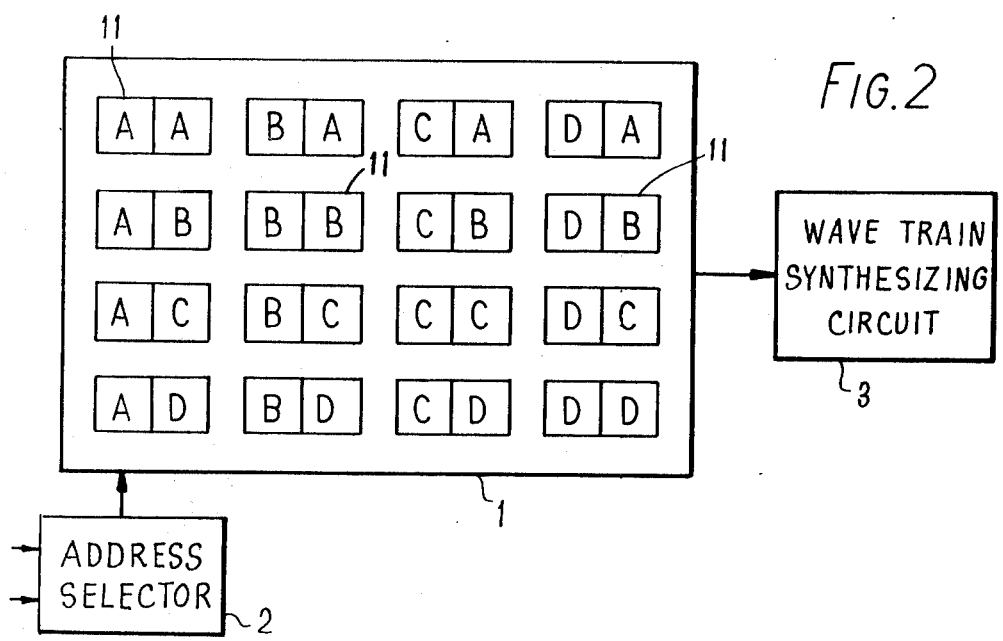
FIG. 2

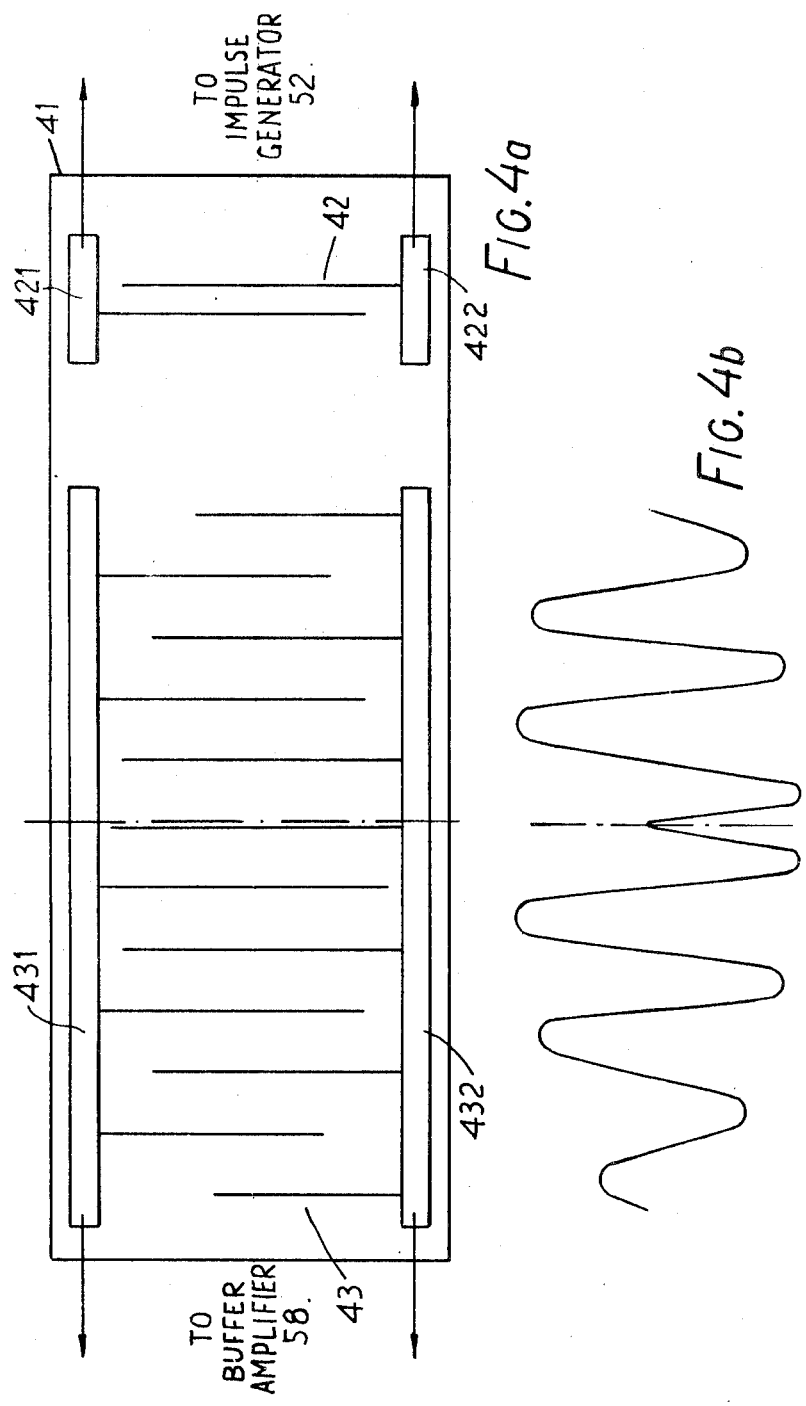

PHASE MODULATION SYSTEM FOR COMBINING CARRIER WAVE SEGMENTS CONTAINING SELECTED PHASE TRANSITIONS

This application is a continuation-in-part of application Ser. No. 809,365 filed June 23, 1977 and now abandoned.

The present invention relates to the production of a phase modulated signal.

When information is transmitted in the form of phase modulation of a carrier wave, a requirement exists for fast switching from one phase to another at transitions between adjacent phase values, or "symbols". Typically the symbol periods are short and a difficulty arises in generating acceptable waveforms at the transitions.

It is an object of this invention to overcome or reduce the difficulty referred to above.

According to the invention from one aspect there is provided signalling apparatus for producing a wave train which maintains one of a plurality of predetermined phase positions representing respective symbols during symbol transmitting periods, and which changes from one to another of said phase positions only during short transition periods between said symbol transmitting periods, said apparatus comprising waveform source means which makes separately available a plurality of different oscillations, respectively defining all the possible phase transitions, each oscillation including a respective phase transition and a plurality of cycles at both sides of that transition the phases at the respective sides defining that transition, and selecting means for changing from one of said oscillations to another during symbol transmitting periods, the two oscillations between which changing occurs being in the same phase position while changing occurs and the second oscillation undergoing the desired phase transition during the next transition period.

According to the invention from another aspect there is provided a data transmission arrangement for transmitting a carrier wave, phase modulated by the data, such that, in each of a plurality of adjacent symbol periods, the phase of said carrier wave measured relative to a reference carrier wave having the same frequency of oscillation assumes one of a plurality of permitted values representing respective symbols with phase transitions occurring between the symbol periods, including a source of separate waveforms defining respective ones of said phase transitions, each waveform including a respective phase transition and at both sides of the transition, a plurality of cycles of oscillation of the carrier wave frequency phases at the respective sides defining said transition, means for selecting respective ones of said waveforms, and means for combining the waveforms appropriate to successive transitions by combining the cycles of oscillation of these separate waveforms which relate to the same symbol.

An embodiment of the invention is applicable to systems in which information is transmitted in the form of oscillations (at the carrier wave frequency) with one of four phases (measured relative to reference oscillations) differing by 90° during each of a number of successive symbol periods. If the symbol periods are very short, (for example extending over only a few cycles of the carrier wave), the switching between successive phases for different symbols must be very fast and this can give rise to difficulties in achieving acceptable waveforms over the transition between phases. Since, in this system, the phase in one symbol period can assume any of the four permitted values, as can the phase in the succeeding symbol period, there are sixteen possible combinations of first and second states which have to be allowed for, from one symbol to the next.

The embodiment overcomes the difficulty of fast phase switching by having available stored replicas of the waveforms required for the transitions between different phases. These waveforms can be designed to have whatever characteristics are considered desirable for the transition between phases, and include more than one half of each of the successive symbols separated by the transition. The required signal is generated by merging successive stored replicas over the interval when they are nominally of the same phase (i.e. over the overlapping parts of the same symbol). In this way any switching is done relatively slowly and is only between nominally inphase states.

In order that the invention may be clearly understood and readily carried into effect, some embodiments thereof will now be described by way of example only, with reference to the accompanying drawings, in which:

FIG. 1 represents, in simplified and schematic form, part of a phase modulated carrier wave, FIG. 2 shows a store containing waveforms which include possible changes from a first to a second symbol phase, FIG. 3 shows how waveforms, derived from the store of FIG. 2 in the appropriate order, can be combined to synthesize the modulated wave shown in FIG. 1, FIG. 4a is a symbolic representation of a surface acoustic wave (SAW) device for use in the invention, FIG. 4b is a representation of a waveform producible in the SAW device of FIG. 4a, and FIG. 5 is a block diagram of a practical embodiment of the invention using SAW devices of the type shown in FIG. 4.

Referring now to FIG. 1, the various rectangles shown therein are all of equal length and represent a sequence of successive symbol periods in accordance with the prescribed rate of data transmission. The capital letter A, B, C or D in each rectangle represents one of four permitted values of the phase of the carrier wave. It will thus be seen that the phase in the successive symbol periods shown are A,B,C,C,B,D and A; representing part of a sequence extending over a considerably longer time than represented by the seven time intervals shown.

Referring now to FIG. 2, there is represented a waveform source means in the form of a matrix 1 of sixteen surface acoustic wave (SAW) devices 11 for producing sixteen waveforms, each waveform representing a transition from one of the permitted phases to another e.g. AB or a maintaining of the same phase e.g. DD as the case may be. The SAW devices 11 are represented as grouped in rows and columns for simplicity although it will be appreciated that such grouping is not intended to infer that they are actually arranged in such a format or even that they are arranged in a two-dimensional matrix at all.

An address selector 2 is supplied with information concerning the desired phases in each two successive symbol periods and generates an address signal which calls up the waveform producible at the desired location of the matrix and applies that waveform to a wave train synthesizing circuit 3. Each waveform produced by the SAW devices, in fact comprises not only a transition between two permitted phases, but also contains a number of cycles of the carrier wave frequency, with the appropriate phase, at respective sides of the transition. Each SAW device is arranged to produce a waveform lasting for between one and a half to two symbol periods (i.e. the transition and between three-quarters and one symbol period either side thereof). The phases of the waveforms produced by the SAW devices must be fixed, relative to a reference oscillation of the same frequency, and thus it is desirable that there is an integral number of cycles of the carrier wave frequency in each symbol period.

The wave train synthesizing circuit 3 assembles the waveforms produced successively by the SAW devices 11 to construct the wave train shown in FIG. 1 by adding the oscillation following one transition with the oscillation preceding the next transition; both oscillations are at least nominally of the same phase because they represent the permitted phase value prevailing in a common symbol period, and because of the aforementioned arrangement that there is an integral number of cycles of the carrier wave in each symbol period.

If the wave train is being synthesized at a relay station to replicate data transmitted from a remote station, the symbol periods are defined by the incoming data. Since the waveforms have been generated locally, the frequency of the carrier wave produced by assembling the waveforms may not correspond accurately with an integral multiple of the symbol periods defined by the incoming carrier wave. In these circumstances the two waveforms to be added in synthesizing the content of the train of FIG. 1 during two successive symbol periods may not be exactly in phase due to timing errors. To avoid phase discontinuity problems, the two oscillations should have suitable amplitude weightings applied before adding, the first oscillation amplitude being caused to gradually decrease whilst the second oscillation gradually increases, the amplitudes being substantially complementary. This is symbolically represented in FIG. 3 by the sloping lines, on the waveforms produced by the matrix, in the regions of overlap of those waveforms. The slopes are linear in the drawing but this need not be the case, and (for example) $\cos^2\theta$ and $\sin^2\theta$ waveforms can be used if desired.

An examplary embodiment of the invention will now be described with reference to FIGS. 4 and 5.

The apparatus of FIG. 5 comprises a matrix 51 of 16 SAW devices 511 which are connected to an impulse generator 52 to selectively receive electrical impulses. The devices 511 are arranged to produce amplitude weighted waveforms including phase transitions (as described above) in response to the impulses.

FIG. 4a is a symbolic representation of such an SAW device arranged to produce in response to an impulse an amplitude-weighted waveform including a phase transition as shown in FIG. 4b. The manner of construction of such an SAW device is known to those skilled in the art of SAW devices. For instance, an article in "IEEE Transactions on Microwave Theory and Techniques, Vol.MTT-21, No.4, April 1973" on pages 162 to 175, entitled "Impulse Model Design of Acoustic Surface-Wave Filters" by Hartmann et al, discusses an SAW device for producing an amplitude weighted waveform in response to an impulse. The same article refers to phase weighted SAW devices. Furthermore, another article on pages 263 to 271 of the same issue of those IEEE Transactions entitled "Application of Acoustic Surface-wave Technology to Spread Spectrum Communications" by Bell et al, discloses an SAW device for producing a biphase phase-shift-keyed signal waveform comprising 100 symbol periods (or chips as they are called in that article).

In essence, each device comprises a piezoelectric substrate 41 on a surface of which two inter-digital transducers are deposited. One transducer 42 is a launch transducer having a broad frequency response and is arranged to receive an electrical impulse applied across its pads 421 and 422 by the impulse generator 52. The inter-digital fingers of the transducer 42 convert the electrical impulse into an acoustic wave which propagates in the surface region of the substrate 41. The other transducer 43 is arranged to convert the acoustic wave into a desired electrical signal having an amplitude-weighted waveform including a phase transition. The output of the transducer 43 comprises its pads 431 and 432.

Referring again to FIG. 5, the matrix 51 comprises SAW devices 511 for producing respective amplitude-weighted waveforms including the 16 possible phase transitions between the permitted symbols A to D. These waveforms are produced in response to impulses selectively received by them from the impulse generator and are applied to respective ones of 16 buffer amplifiers 58. The outputs of the amplifiers 58 are connected to the waveform synthesising circuit in tne form of an analogue adder 3. Switches 53, which are illustrated as mechanical switches, but in practice would be, in this example, electronic switches of known form, select which SAW device is to receive an impulse at any one time. The switches 53 are controlled by the address selector 2.

The address selector 2 comprises a phase sensitive detector 54 having an input 541 for receiving the phase modulated waveform (as shown in FIG. 1, for example) to be relayed, and a reference input 542 for receiving a phase reference signal. The detector 54 produces an analogue output representing the symbols A to D. An analogue to digital converter 55 converts the output of the detector to digital form. As only the four symbols A to D are involved in this example, the converter outputs a 2-bit code representing each symbol A,B,C or D. A succession of codes is produced in response to the waveform received at the input 541. In order to identify each transition between the phases, it is necessary to store the pairs of symbols giving rise to that transition. For this purpose the codes are serially fed to a 4-bit shift register 56. In this way 16 different four bit codes representing the respective different possible transitions between the four symbols A to D are produced. These four bit codes are fed to an address converter 57. The converter 57 has sixteen outputs connected to the respective switches 53. It produces in response to any one of the 16 different four bit codes representing a particular phase transition a control signal on that output connected to the switch 53 which is connected to the SAW device 511 arranged to produce the waveform including that transition. The switch 53 connects its associated SAW device 511 to the generator 52 in response to the control signal.

Various modifications of the preceding embodiment and alternative embodiments will be apparent to those skilled in the art.

For instance, instead of selectively impulsing the 16 SAW devices 511, the devices could be simultaneously impulsed and the desired outputs selected by a suitable commutator connected between the SAW devices and the adder 3.

Instead of incorporating the amplitude weighting in the design of the SAW devices, means may be provided externally of the devices to amplitude weight their outputs, the devices having a linear amplitude response.

If the same symbol were to prevail over three or more successive symbol periods, then the same SAW device is required to respond to a second impulse whilst still providing an output signal in response to the previous impulse. If the SAW device has completely linear amplitude response this does not cause any problems, but in practice it can be more acceptable to provide two separate SAW devices for such an eventuality. Since the sequence of symbol phases is known in advance, any switching between the SAW devices can easily be controlled by the data stream itself. Only the lines providing the phase transitions A/A, B/B, C/C and D/D would have to be duplicated.

The number of SAW devices required can be reduced by making them double ended, i.e. placing receiver transducers at either end and a launcher transducer in the centre of the substrate of each device. The aforementioned impulses can then be applied in the central transducer and respective phase transition waveforms can be obtained from the pairs of transducers at the ends of the substrate. By this means, it is possible to reduce to ten the number of SAW devices nominally required (i.e. not allowing for the possibility of duplication in the case of successive transitions such as A/A). If A,B,C and D represent quadrature phases taken in order (e.g. 45°,−45°,−135°135°, respectively) this is achieved by providing one device disposed to give A/A and B/B transitions from its respective end transducers, another similar device to give C/C and D/D transitions from its end transducers, four devices giving respectively A/B, B/C, C/D and D/A transitions (the same transitions occur at both end transducers for these devices two devices giving respectively A/C, D/B and B/D, C/A transitions at their end transducers and finally two devices giving respectively A/D, C/B and B/A, D/C transitions at their end transducers. The number of SAW devices nominally necessary can be further reduced to six, by suitable use of phase inverter circuits connected to selected output transducers of the devices. Selection of the required transitions is effected, in this case at the output end of the devices, all devices being impulsed synchronously.

In order to allow for the fact that some of the SAW devices will be required to receive a drive impulse before they have finished supplying output signals in response to a preceding pulse, it is necessary to place a duplicate set of receiving or output transducers one symbol period "downstream" of each original output transducer. The output is taken from one of these duplicate transducers and a further impulse is not applied to the device. When inverters are used, therefore, a total of six substrates are required on which there are twelve dedicated inverters. The number of inverters could be reduced by multiplying a pair if preferred. The period over which errors can build up phase differences is, however, increased.

If the phase differences due to variations in the symbol rate or carrier wave frequency become significant, it can be necessary to introduce the following additional feature, in which each output transducer arrangement is replaced symmetrically by a pair of such arrangements which are separated (temporally if not physically) by, say, $\lambda/12 = \pm 15°$. The pairs are selected in exactly the same way as was the single transducer arrangement they replace, except that the two outputs are transferred separately to the appropriate one of two pairs of variable weighting circuits. The function of each of these pairs of phase weighting circuits is to differentially weight the two inputs so that when they are subsequently added, the resultant is of any desired delay or "phase" between them. The impressed delay is then swept linearly with time, passing through zero at the instant corresponding to the symbol transition. The magnitudes of the slopes appropriate to the original and "downstream" transducer arrangement are in a fixed proportion (determined by the geometry) and are driven by a sampling loop detecting the residual phase difference during the changeover period. A SAW device can be used here to differentially delay one channel by $\lambda/4$ with respect to the other for driving a quadrature phase detector. Frequency variations still lead to phase errors but only by virtue of a $\lambda/4$ path difference rather than a $7\lambda$ or $19\lambda$ path difference, so that the residual phase error is reduced by about 30 to 80 times.

If the four permitted phases are $\pm 45°, \pm 135°$, they can be synthesised by adding together one vector drawn from 0° or 180° and another, of equal amplitude, from $\pm 90°$.

To generate the transitions corresponding to the $\pm 90°$ vector it is necessary to have one line containing essentially two output transducer arrangements to generate 90°/90° and $-90°/-90°$ phase transitions and another line comprising one output transducer arrangement to generate a 90°/−90° phase transition from which an inverter will produce the remaining transition −90°/90°. Since the input electrode arrangements are pulsed on only alternate symbol transitions, it is necessary to duplicate the output electrode arrangements downstream. The 0° or 180° transitions are produced in a similar way. This technique leads to an even simpler arrangement than the system described previously.

As an alternative to adding externally, it is possible to arrange for the sixteen pairs of vectors to be added together while still in SAW form. In this case, the pairs of SAW waveforms could either be launched in parallel to intercept double-length output electrode arrangements or could be directed in opposite directions down the same path so as to meet at the output arrangement.

What I claim is:

1. Signalling apparatus for producing a wave train which maintains one of a plurality of predetermined phase positions representing respective symbols during symbol transmitting periods, and which changes from one to another of said phase positions only during short transition periods between said symbol transmitting periods, said apparatus comprising waveform source means which makes separately available a plurality of different oscillations respectively defining all the possible phase transitions, each oscillation including a respective phase transition and a plurality of cycles at both sides of that transition the phases at the respective sides defining that transition, and selecting means for changing from one of said oscillations to another during symbol transmitting periods, the two oscillations between which changing occurs being in the same phase position while changing occurs and the second oscillation undergoing the desired phase transition during the next transition period.

2. A data transmission arrangement for transmitting a carrier wave, phase modulated by the data, such that in each of a plurality of adjacent symbol periods the phase of said carrier wave measured relative to a reference carrier wave having the same frequency of oscillation assumes one of a plurality of permitted values representing respective symbols with phase transitions occurring between the symbol periods, including a source of separate waveforms defining respective ones of said phase transitions, each waveform including a respective phase transition and at both sides of the transition a plurality of cycles of oscillation of the carrier wave frequency the phases at the respective sides defining said transition, means for selecting respective ones of said waveforms, and means for combining the waveforms appropriate to successive transitions by combining the cycles of oscillation of these separate waveforms which relate to the same symbol.

3. An arrangement according to claim 2 wherein said source of waveforms comprises at least one surface acoustic wave device having input and output transducer means and wherein the input transducer means receives electrical impulse signals.

4. An arrangement according to claim 3 wherein the surface acoustic wave device is arranged to produce an amplitude-weighted waveform including a phase transition.

5. An arrangement according to claim 3 wherein the input transducer means is a launch transducer having a broad frequency response and the output transducer means is a receiver transducer defining the waveform which said device is arranged to produce.

6. An arrangement according to claim 3 wherein said input and output transducer means are located adjacent opposite ends of said surface acoustic wave device.

* * * * *